United States Patent
Hanawa et al.

(12) 
(10) Patent No.: US 7,807,293 B2
(45) Date of Patent: Oct. 5, 2010

(54) BATTERY PACK AND MOTOR-DRIVEN TOOL USING THE SAME

(75) Inventors: Hiroyuki Hanawa, Ibaraki (JP); Kousei Yokoyama, Ibaraki (JP); Keita Saitou, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 34 days.

(21) Appl. No.: 12/440,464

(22) PCT Filed: Sep. 7, 2007

(86) PCT No.: PCT/JP2007/067893

§ 371 (c)(1),
(2), (4) Date: Mar. 7, 2009

(87) PCT Pub. No.: WO2008/029958

PCT Pub. Date: Mar. 13, 2008

(65) Prior Publication Data

US 2010/0112435 A1 May 6, 2010

(30) Foreign Application Priority Data

Sep. 7, 2006 (JP) .............................. 2006-243358

(51) Int. Cl.
*H01M 2/06* (2006.01)
(52) U.S. Cl. ........................ 429/170; 429/163; 429/175; 429/178; 173/217; 320/112
(58) Field of Classification Search .................. None
See application file for complete search history.

(56) References Cited

U.S. PATENT DOCUMENTS

| 6,329,788 | B1 | 12/2001 | Bailey et al. |
| 6,346,793 | B1 | 2/2002 | Shibata et al. |
| 2004/0242042 | A1 | 12/2004 | Buck et al. |

FOREIGN PATENT DOCUMENTS

| DE | 199 05 086 A1 | 8/2000 |
| EP | 1 787 763 A | 5/2007 |
| JP | 10-308199 A | 11/1998 |
| JP | 2000-061868 A | 2/2000 |
| JP | 2000-218571 A | 8/2000 |
| JP | 2001-128372 A | 5/2001 |
| JP | 2003-036915 A | 2/2003 |
| JP | 2004-327447 A | 11/2004 |

OTHER PUBLICATIONS

JP-2003036915-Translation.*

* cited by examiner

*Primary Examiner*—Patrick Ryan
*Assistant Examiner*—Ladan Mohaddes
(74) *Attorney, Agent, or Firm*—McDermott Will & Emery LLP (57) ABSTRACT

A battery pack (10) includes a housing (11), a group of cells (12), a board (13), a plurality of second terminals (14), and a cover (15). An opening (16*c*) is formed in the housing (11). The board (13) has a terminal arranging part (13A). A plurality of the second terminals (14) are arranged on the terminal arranging part (13A) of the board (13). The cover (15) has a plate-like shape, and covers an area of the board (13) which is positioned between the terminal arranging part (13A) and the opening (16*c*).

6 Claims, 8 Drawing Sheets

FORWARD ←→ BACKWARD

FIG. 6

FORWARD ←→ BACKWARD

FIG. 7

FORWARD ↔ BACKWARD

BATTERY PACK AND MOTOR-DRIVEN TOOL USING THE SAME

TECHNICAL FIELD

The present invention relates to a battery pack and a motor-driven tool employing the battery pack.

BACKGROUND ART

Conventionally, there has been a motor-driven tool which is driven by a battery pack as a driving power, for the purpose of enhancing workability. This battery pack includes a housing formed with an opening, and a group of cells, a board, and a first terminal are contained in the housing. The terminal is provided near the opening so as to be engaged with a second terminal of a body part of the motor-driven tool or a charger. The board is disposed at a position remote from the terminal and connected to the terminal by a lead wire.

DISCLOSURE OF THE INVENTION

However, the conventional battery pack has had a complicated structure and an increased number of components, because the board and the terminal have been positioned remote from each other. For this reason, the battery pack has been expensive, and hence, the motor-driven tool employing the battery pack has been also expensive.

In view of the above, it is an object of the invention to provide a battery pack which can be simplified in structure and can be produced at a low cost, and a motor-driven tool provided with the battery pack.

In order to attain the above described object, there is provided, according to the invention, a battery pack including a housing formed with an opening through which a protective member for protecting a plurality of first terminals of an electric apparatus is adapted to be inserted, a board disposed in the housing and having a terminal arranging part, a plurality of second terminals positioned in the housing and provided on the terminal arranging part of the board, the second terminals being adapted to be engaged with the first terminals, and a cover which covers an area of the board positioned between the terminal arranging part and the opening.

In this case, it would be preferable that the cover is clamped between the board and the housing.

Further, it would be preferable that the plurality of the second terminals includes a terminal with positive polarity and a terminal with negative polarity, and the cover is provided with a protuberance between the terminal with positive polarity and the terminal with negative polarity at a front side in a direction of inserting the first terminals.

Still further, it would be preferable that the cover is provided with projected parts which are interposed between the adjacent terminals of the plurality of the second terminals.

Still further, it would be preferable that the cover is provided with erected parts which extend in a direction perpendicular to the board, at a back side of the projected parts in the direction of inserting the first terminals.

Moreover, in order to attain the above described object, there is provided, according to an aspect of the invention, a motor-driven tool comprising a body part having an output part, a grasping part extended from the body part, and a battery pack which is detachably mounted on the grasping part, characterized in that the battery pack includes a housing formed with an opening, a board disposed in the housing and having a terminal arranging part, a plurality of terminals positioned in the housing and provided on the terminal arranging part of the board, and a cover which covers an area of the board positioned between the terminal arranging part and the opening.

According to another aspect of the invention, because the cover which covers the area of the board positioned between the terminal arranging part and the opening is provided on the relevant area, it is possible to restrain intrusion of a foreign material onto the board, and hence, damage of the board by the foreign material can be restrained. Moreover, because a plurality of the second terminals are mounted on the terminal arranging part of the board, and there is provided the cover which covers the area of the board positioned between the terminal arranging part and the opening, the structure of the battery pack can be simplified, and the battery pack can be produced at a low cost.

According to another aspect of the invention, because the cover is clamped between the board and the housing, it is possible to position the cover without providing a positioning member.

According to another aspect of the invention, because the cover is provided with the protuberance between the terminal with positive polarity and the terminal with negative polarity at the front side in the direction of inserting the first terminals, even in case where a nail or the like has entered into the opening of the housing, for example, it is possible to prevent a short circuit which will occur when the nail has come into contact with the terminal with positive polarity and the terminal with negative polarity at the same time.

Still further, according to another aspect of the invention, because the cover is provided with the projected parts which are interposed between the adjacent terminals of a plurality of the second terminals, it is possible to restrain intrusion of a foreign material onto the board through between the adjacent terminals, and hence, damage of the board by the foreign material can be restrained.

Still further, according to another aspect of the invention, because the cover is provided with the erected parts which extend in the direction perpendicular to the board, at the back side of the projected parts in the direction of inserting the first terminals, it is possible to restrain intrusion of a foreign material from a front side to a back side in the direction of inserting the first terminals through between the adjacent terminals.

Still further, according to another aspect of the invention, because the motor-driven tool has the battery pack which is provided with a plurality of the terminals on the terminal arranging part of the board, and the cover which covers the area of the board positioned between the terminal arranging part and the opening, it is possible to provide a low-cost motor-driven tool.

BEST MODE FOR CARRYING OUT THE INVENTION

Figure 1:
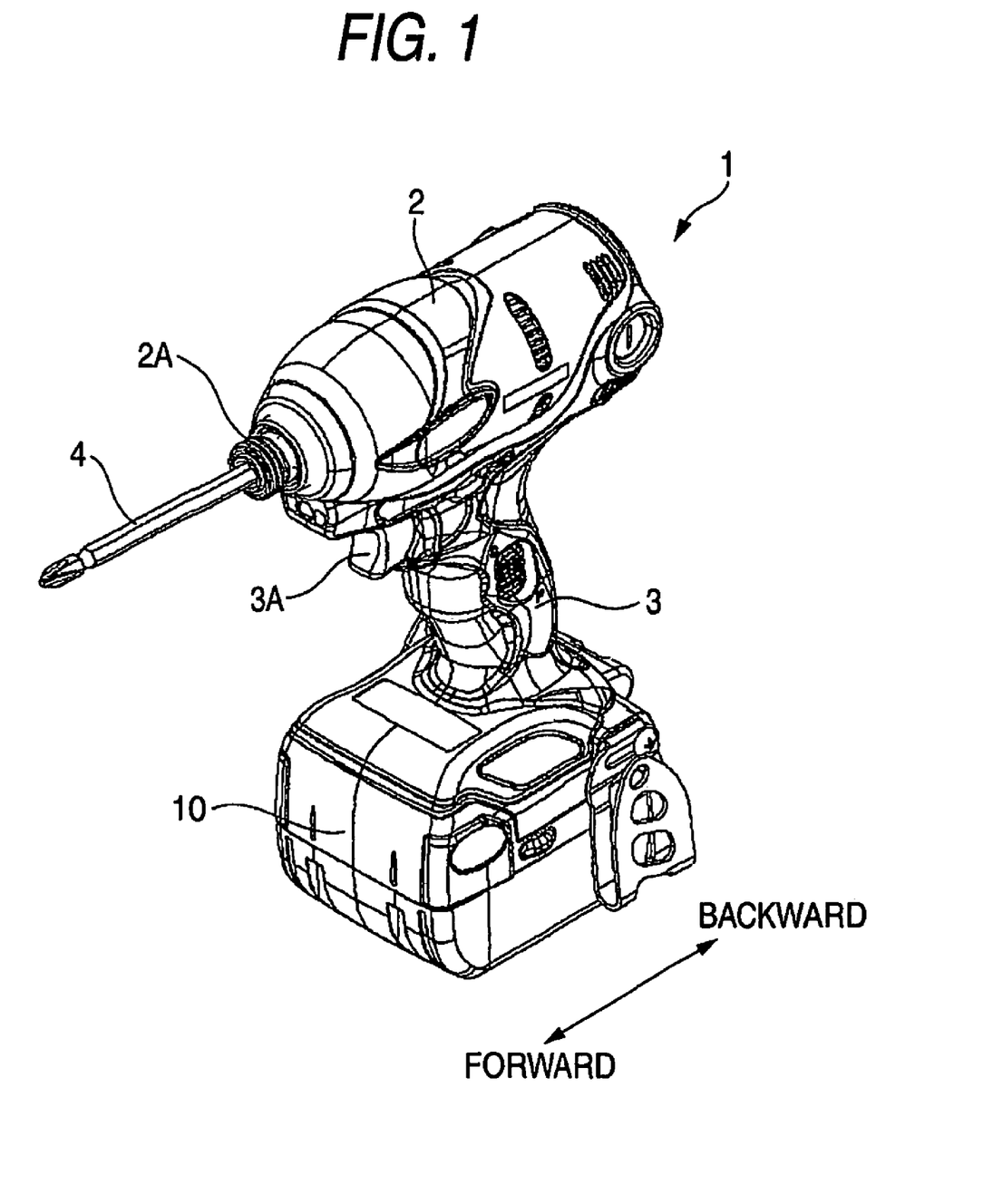
FIG. 1 is a perspective view of a motor-driven tool provided with a battery pack in an embodiment according to the invention.

The battery pack and the motor-driven tool provided with the battery pack in an embodiment according to the invention will be described referring to FIGS. 1 to 9. In the following description, the direction as shown in FIGS. 1 to 8 will be referred to as the longitudinal direction. As shown in FIG. 1, a drill 1 as the motor-driven tool mainly includes a body part 2, a handle 3, and a battery pack 10.

Figure 2:
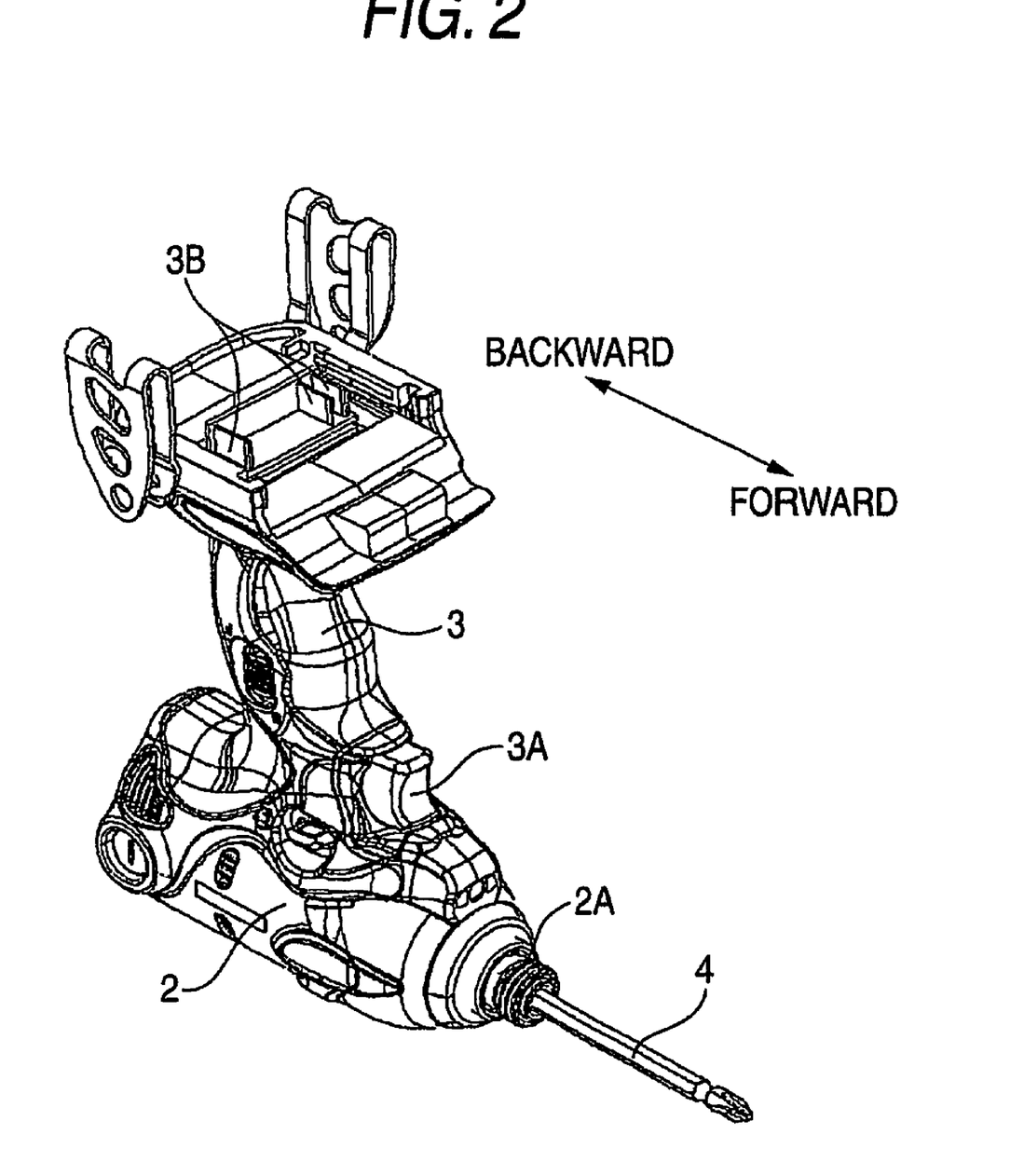
FIG. 2 is a perspective view of a body part of the motor-driven tool in FIG. 1 in a state inverted upside down.
Figure 3:
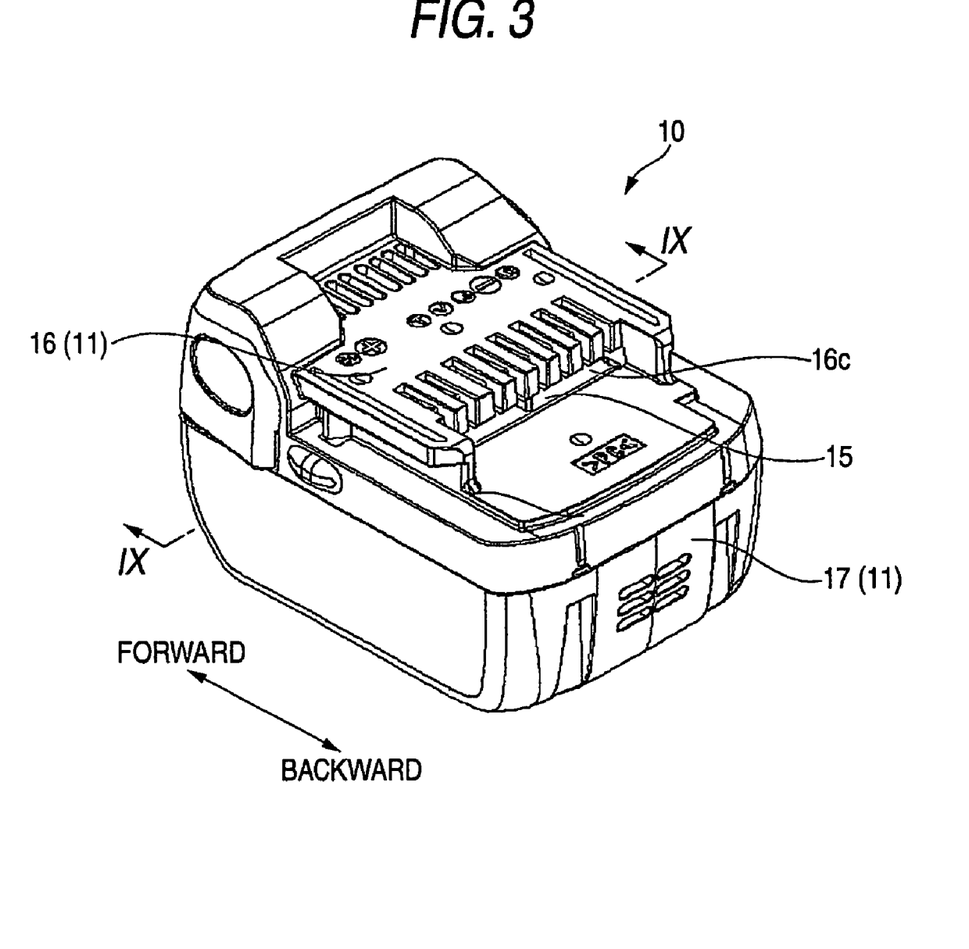
FIG. 3 is a perspective view of the battery pack in the embodiment according to the invention.

A motor, which is not shown, is incorporated in the body part 2, and a tool holding part 2A which is an output part and to which a drill bit 4 can be fitted is provided at a distal end portion of the body part 2. The handle 3 is extended from a backward end area of the body part 2, and a trigger 3A is provided at a base end of the extended area. The trigger 3A will control electric power which is supplied from the battery pack 10 to the motor which is not shown. Moreover, as shown in FIG. 2, a plurality of first terminals 3B in a plate-like shape which are adapted to be engaged with a plurality of second terminals 14, which will be described below, are provided at an end of the handle 3 in the extended direction thereof.

The battery pack 10 is mounted to a distal end portion of the handle 3 in the extended direction so as to be attached or detached along the longitudinal direction of the drill 1. The battery pack 10 will be described in detail referring to FIGS. 3 to 8. The battery pack 10 includes a housing 11, a group of cells 12, a board 13, a plurality of the second terminals 14, and a cover 15. The housing 11 includes an upper housing 16 and a lower housing 17, and contains therein the group of cells 12, the board 13, a plurality of the second terminals 14, and the cover 15. The upper housing 16 mainly includes a terminal inserting part 16A and an opening defining part 16B. An opening 16c in a substantially rectangular shape is defined by the terminal inserting part 16A and the opening defining part 16B. The opening 16c serves as an insertion inlet into which a plate-shaped protective member for protecting a terminal of the charger, which is not shown, is to be inserted, when the battery pack 10 is charged by connecting it to the charger. The terminal inserting part 16A has a plurality of slots 16d which open backward.

Figure 4:
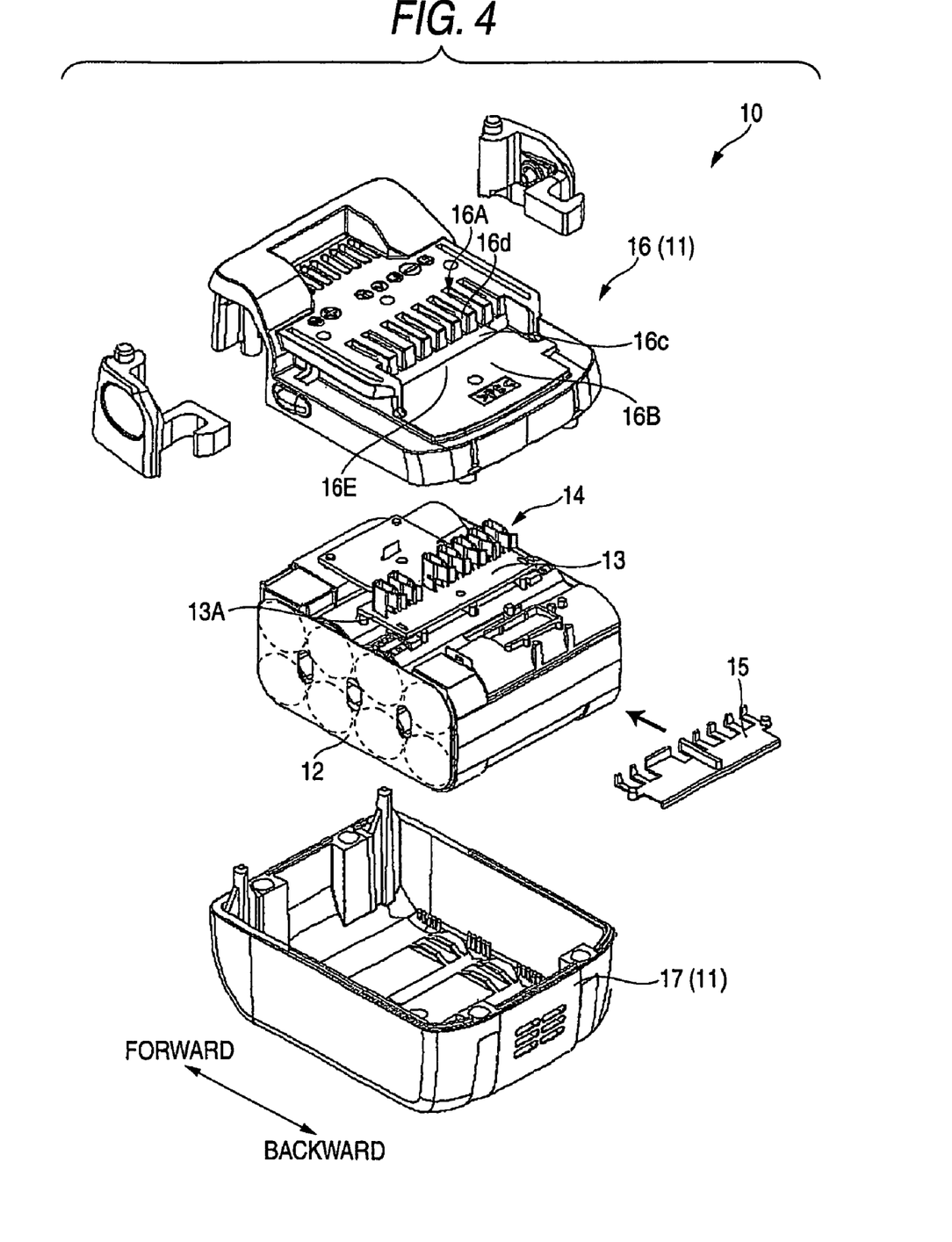
FIG. 4 is an exploded perspective view of the battery pack in the embodiment according to the invention.
Figure 5:
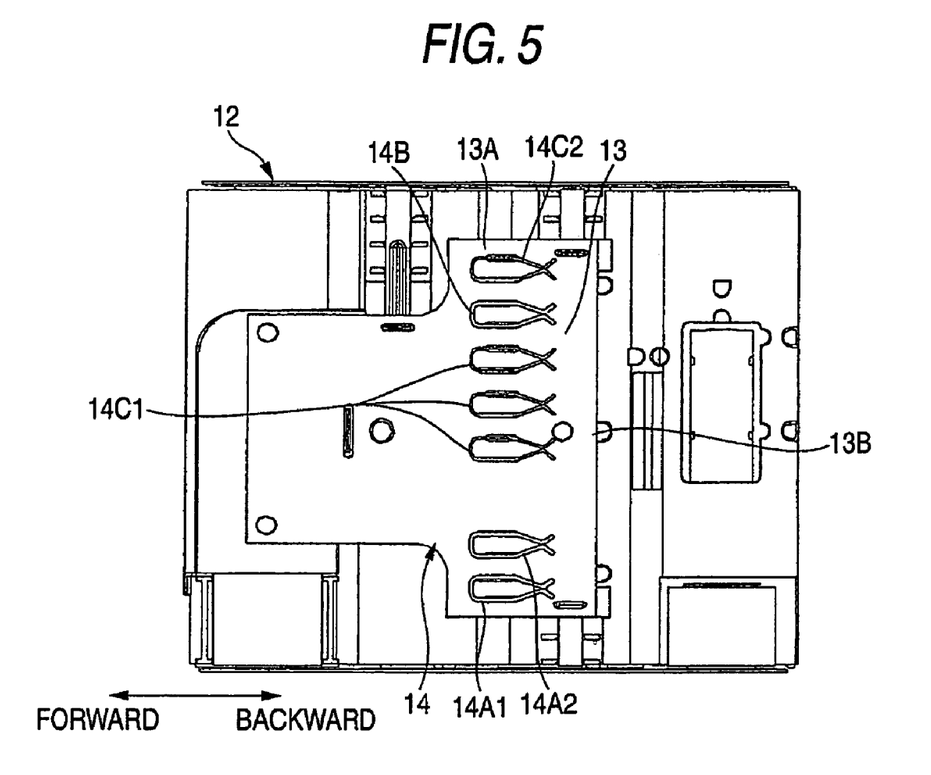
FIG. 5 is a plan view showing a group of cells, a board and second terminals of the battery pack in the embodiment according to the invention.

As shown in FIG. 4, the group of cells 12 includes a plurality of cells. Each of the cells is a nickel metal hydride battery or a lithium-ion battery which can be charged and discharged at a plurality of times. The board 13 is provided above the group of cells 12 and electrically connected to the group of cells 12. As shown in FIG. 5, a terminal arranging part 13A extending along the longitudinal direction of the opening 16c is defined on the board 13. Moreover, a backward end edge 13B of the board 13 is so arranged as to be opposed to a forward end edge 16E (See FIG. 4) of the opening defining part 16B of the upper housing 16.

A plurality of the second terminals 14 are arranged on the terminal arranging part 13A of the board 13 in parallel along the longitudinal direction of the opening 16c, and electrically connected to the board 13. A plurality of the second terminals 14 will be respectively positioned in the slots 16d, when the battery pack 10 has been integrally assembled (See FIG. 9).

Moreover, as shown in FIG. 5, each of the second terminals 14 has such a shape that a flat plate is bent into U-shape and both end portions of the flat plate are brought into contact with each other so as to close an open end thereof. When the battery pack 10 is attached to the distal end portion of the handle 3, the first terminals 3B will be inserted into the slots 16d from the back, and pressure-fitted into the second terminals 14 in a manner of spreading the open ends thereof, whereby the first terminals 3B will be engaged with the second terminals 14.

A plurality of the second terminals 14 includes a charging terminal with positive polarity 14A1, a discharging terminal with positive polarity 14A2, a charging and discharging terminal with negative polarity 14B, and signal transmitting terminals 14C1, 14C2. The terminals with positive polarity 14A1, 14A2 and the terminal with negative polarity 14B are positioned near opposite ends of the terminal arranging part 13A, and the signal transmitting terminals 14C1 are positioned between them. The terminals with positive polarity 14A1, 14A2 and the terminal with negative polarity 14B will make a short circuit, when a nail or the like has come into contact with them at the same time. On the other hand, the signal transmitting terminals 14C1, 14C2 are so constructed that they will not make a short circuit, even though a nail or the like has come into contact with them at the same time. The electric power stored in the group of cells 12 will be supplied to the body part 2 through the board 13 and the second terminals 14. Moreover, the electric power will be supplied from the charger, which is not shown, to the group of cells 12 through the board 13 and the second terminals 14, whereby the group of cells 12 will be charged.

The cover 15 will be described referring to FIGS. 6 to 9. FIG. 7 shows the cover 15 in a state mounted on the board 13 and the second terminals 14 which are shown in FIG. 5. The cover 15 includes a board covering part 15A, a pair of clamped parts 15B, a protuberance 15C, a plurality of projected parts 15D, and a plurality of erected parts 15E. The board covering part 15A is formed in a shape of a plate having a substantially same width as a longitudinal length of the opening 16c. The board covering part 15A covers an area of the board 13 which is positioned between the terminal arranging part 13A and the opening 16c.

Figure 8:
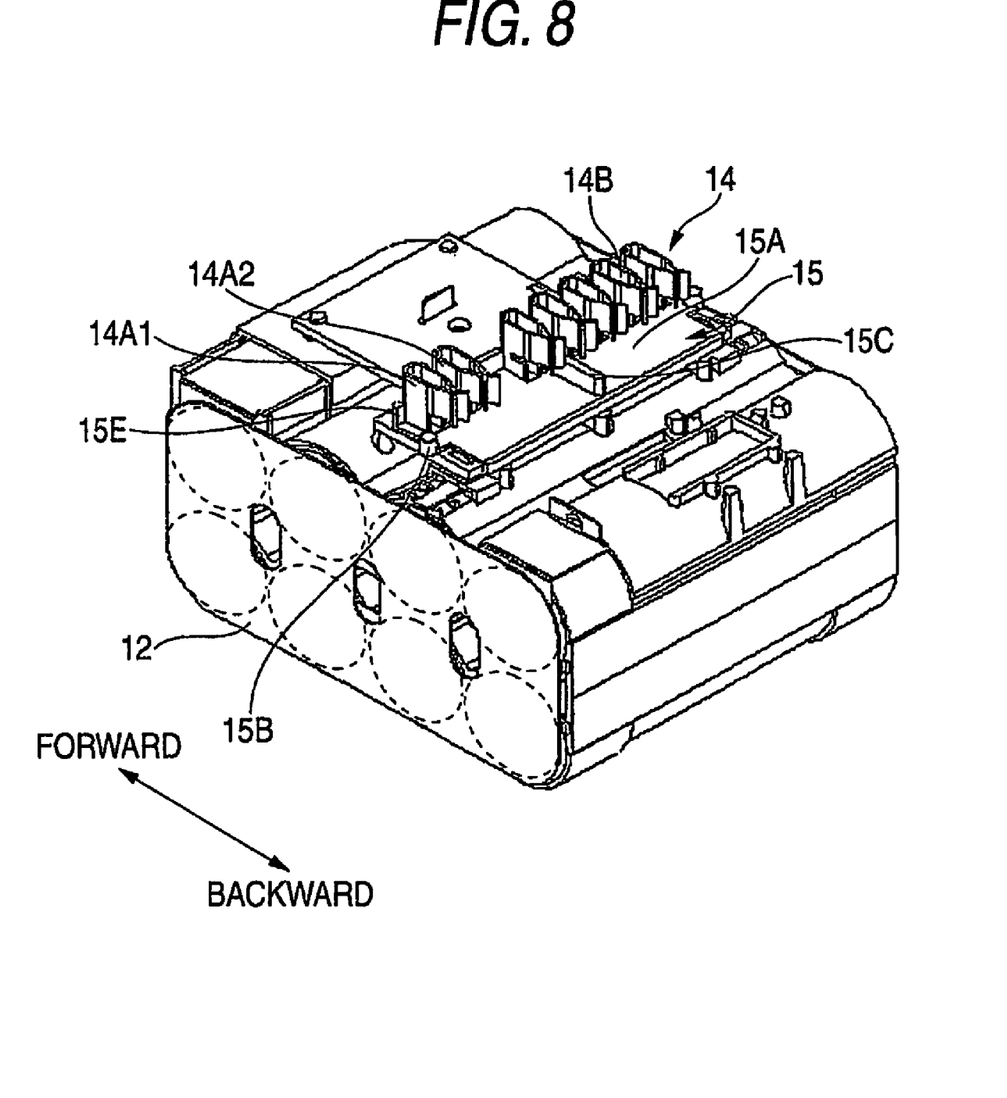
FIG. 8 is a perspective view of the group of cells, the board, the second terminals, and the cover of the battery pack in the embodiment according to the invention.
Figure 9:
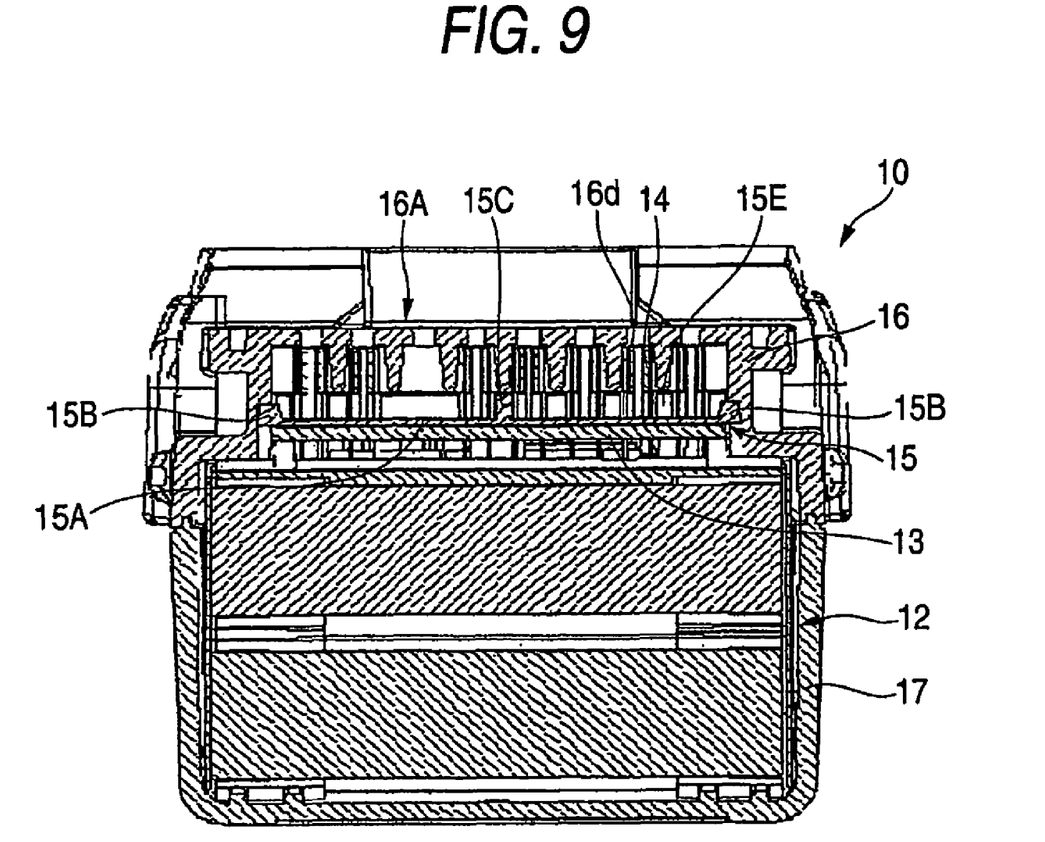
FIG. 9 is a sectional view taken along a line IX-IX in FIG. 3.

The pair of the clamped parts 15B are respectively provided at opposite ends of the board covering part 15A in a lateral direction. As shown in FIG. 9, the clamped parts 15B are clamped between the upper housing 16 and the board 13. In this manner, the cover 15 is fixed and positioned inside the housing 11. Moreover, as shown in FIGS. 7 and 8, the protuberance 15C is formed so as to extend from a back side to a front side of the board covering part 15A, at a position between the terminals with positive polarity 14A1, 14A2 and the terminal with negative polarity 14B.

Figure 6:
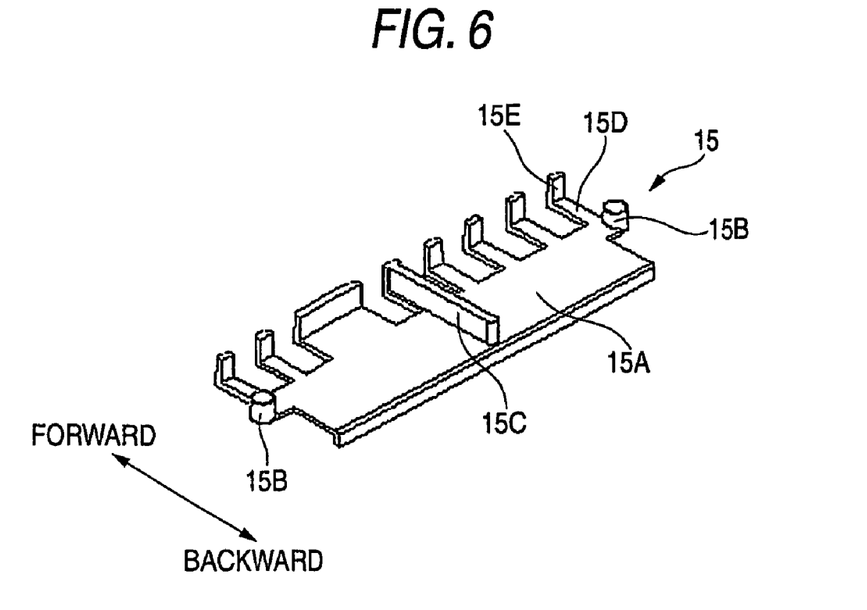
FIG. 6 is a perspective view of a cover of the battery pack in the embodiment according to the invention.
Figure 7:
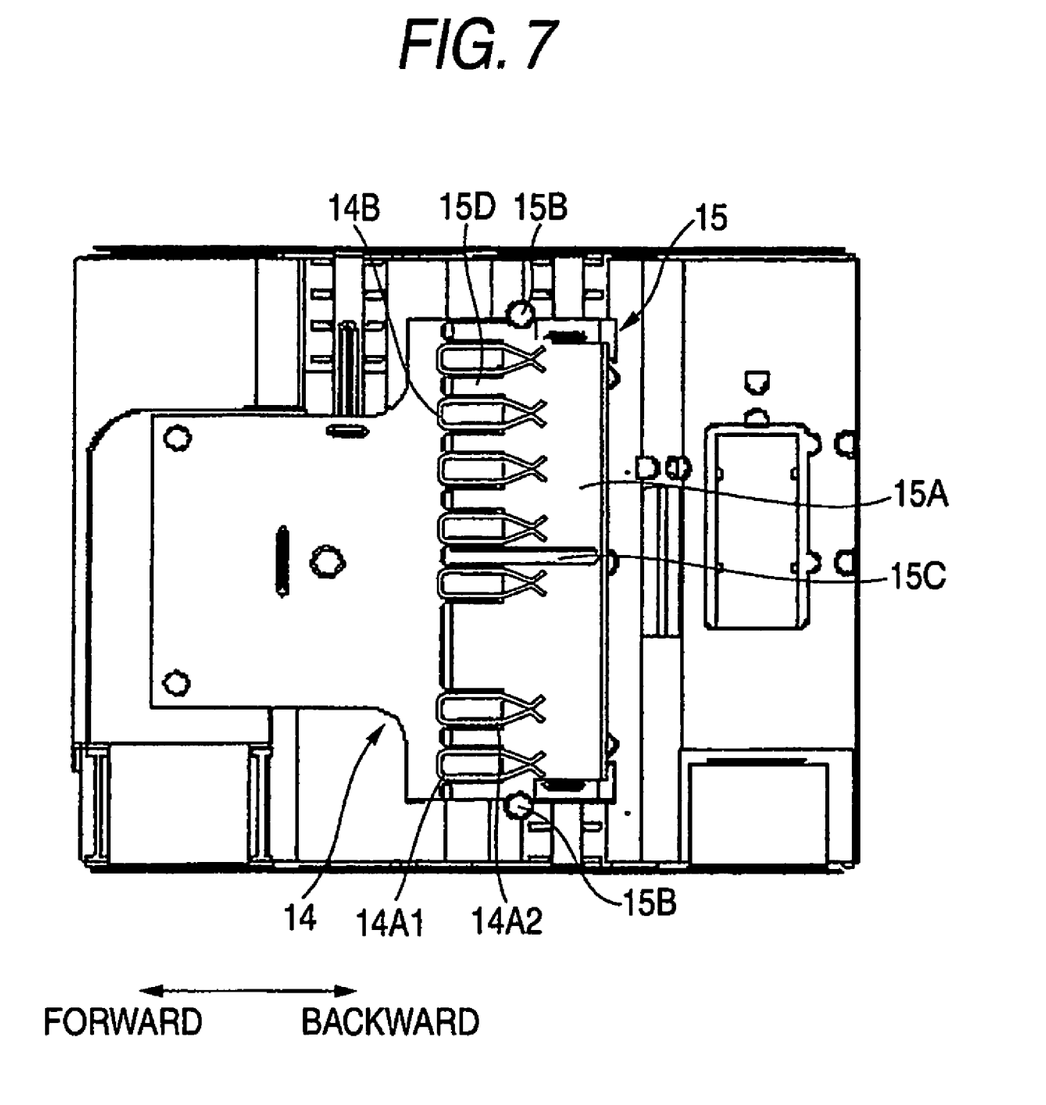
FIG. 7 is a view showing the cover in a state mounted on the group of cells, the board and the second terminals as shown in FIG. 5.

As shown in FIGS. 6 and 7, a plurality of the projected parts 15D are respectively extended from a forward end edge of the board covering part 15A up to almost forward ends of a plurality of the second terminals 14 so as to be interposed between the adjacent terminals of a plurality of the second terminals 14. As shown in FIGS. 6, 8, and 9, a plurality of the erected parts 15E are respectively extended from forward ends of the projected parts 15D in a direction perpendicular to the board 13, up to the terminal inserting part 16A of the upper housing 16.

As described above, according to the battery pack 10 in this embodiment, the cover 15 is provided on the board 13, and the board covering part 15A covers the area of the board 13 which is positioned between the terminal arranging part 13A of the board 13 and the opening 16c. Therefore, it is possible to restrain intrusion of a foreign material such as a nail onto the board 13 through the opening 16c, and damage of the board 13 by the foreign material can be restrained. Moreover, the cover 15 is clamped between the upper housing 16 and the board 13 by means of a pair of the clamped parts 15B. In this manner, the cover 15 is fixed and positioned inside the housing, and so, it is possible to position the cover 15 without particularly providing a positioning member.

Further, the protuberance 15C is provided on the board covering part 15A at a position between the terminals with positive polarity 14A1, 14A2 and the terminal with negative polarity 14B. Therefore, even in case where a nail or the like has entered into the opening 16c of the housing 11, for example, it is possible to prevent a short circuit which will occur when the nail has come into contact with the terminals with positive polarity 14A1, 14A2 and the terminal with negative polarity 14B at the same time. Still further, a plurality of the projected parts 15D are respectively interposed between the adjacent terminals of a plurality of the second terminals 14. As the results, it is possible to restrain intrusion of a foreign material onto the board 13 through between the adjacent terminals, whereby damage of the board 13 by the foreign material can be restrained. Still further, a plurality of the erected parts 15E are respectively extended from the forward ends of the projected parts 15D up to the terminal inserting part 16A of the upper housing 16. As the results, it is possible to restrain intrusion of a foreign material from the back side to the front side of the second terminals 14 through between the adjacent terminals.

According to the battery pack 10 in this embodiment, a plurality of the second terminals 14 are provided on the terminal arranging part of the board 13, and there is provided the cover 15 which covers the area of the board 13 positioned between the terminal arranging part 13A and the opening 16c. As the results, the battery pack 10 can be simplified in structure, and can be produced at a low cost. Moreover, according to the motor-driven tool 1 in this embodiment, the motor-driven tool 1 is provided with the low-cost battery pack 10. Consequently, it is possible to provide a low-cost motor-driven tool 1.

The battery pack and the motor-driven tool provided with the battery pack according to this invention is not limited to the above described embodiment, but various modifications and improvements can be made within a scope as described in the scope of claims for patent.

The invention claimed is:

1. A battery pack comprising:
   a lower housing;
   at least one cell positioned in said lower housing;
   a circuit board disposed above said at least one cell and electrically connected to said at least one cell, said circuit board having an associated terminal section;
   a plurality of terminals electrically connected to said circuit board and extending from said terminal section, said plurality of terminals including a positive terminal, a negative terminal, and a signal communicating terminal positioned between said positive terminal and said negative terminal;
   an upper housing engaged with said lower housing, said upper housing including a terminal insertion section covering said plurality of terminals, an opening defining section positioned below said terminal insertion section, and an opening interposed between said terminal insertion section and said opening defining section, said opening being open to said plurality of terminals from the direction of said opening defining section; and
   a cover positioned to protect against foreign matter entering to said circuit board through said opening, said cover including a first section covering an upper surface of said circuit board adjacent to said opening defining section and a second section extending between terminals of said plurality of terminals.

2. The battery pack of claim 1, wherein:
   each of said plurality of terminals comprises a base portion extending from said terminal section toward said upper housing, and an end portion extending from said base portion toward said opening, and said first section being positioned between said end portion and said circuit board.

3. A charger for charging a removably mounted battery pack wherein:
   said battery pack comprises:
      a lower housing;
      at least one cell positioned in said lower housing;
      a circuit board disposed above said at least one cell and electrically connected to said at least one cell, said circuit board having an associated terminal section;
      a plurality of terminals electrically connected to said circuit board and extending from said terminal section, said plurality of terminals including a positive terminal, a negative terminal, and a signal communicating terminal positioned between said positive terminal and said negative terminal;
      an upper housing engaged with said lower housing, said upper housing being formed with a terminal insertion section covering said plurality of terminals, an opening defining section positioned below said terminal insertion section, and an opening interposed between said terminal insertion section and said opening defining section, said opening being open to said plurality of terminals from the direction of said opening defining section; and
      a cover positioned to protect against foreign matter entering to said circuit board through said opening, said cover including a first section covering an upper surface of said circuit board adjacent said opening defining section and a second section extending between terminals of said plurality of terminals,
   said charger comprising:
      charging terminals; and
      a protective member for protecting said charging terminals, said protective member being configured whereby when said battery pack is mounted on the charger, said protective member mates with said battery pack via said opening and said plurality of terminals and said charging terminals are connected.

4. The charger of claim 3, wherein:
   each of said plurality of terminals comprises a base portion extending from said terminal section toward said upper housing, and an end portion extending from said base portion toward said opening, and said first section being positioned between said end portion and said circuit board.

5. An electrical tool including a removably mounted battery pack comprising:
   a motor;
   a power supply terminals for supplying electric power from said battery pack to the motor; and
   a switch controlling electricity supplied to said motor from said power supply terminals, wherein said battery pack comprises:
  a lower housing;
  at least one cell positioned in said lower housing;
  a circuit board disposed above said at least one cell and electrically connected to said at least one cell, said circuit board having an associated terminal section;
  a plurality of terminals electrically connected to said circuit board and extending from said terminal section, and including a positive terminal and a negative terminal electrically connecting to said plurality of power supply terminals of said electrical tool when said battery pack is mounted to said electrical tool;
  an upper housing engaged with said lower housing, said upper housing including a terminal insertion section covering said plurality of terminals, an opening defining section positioned below said terminal insertion section, and an opening interposed between said terminal insertion section and said opening defining section, said opening being open to said plurality of terminals from the direction of said opening defining section; and
  a cover positioned to protect against foreign matter entering to said circuit board through said opening, said cover including a first section covering an upper surface of said circuit board adjacent said opening defining section and a second section extending between terminals of said plurality of terminals.

6. The power electrical tool of claim 5, wherein:
each of said plurality of terminals comprises a base portion extending from said terminal section toward said upper housing, and an end portion extending from said base portion toward said opening, and said first section being positioned between said end portion and said circuit board.

* * * * *